US009455875B2

(12) United States Patent
Li et al.

(10) Patent No.: US 9,455,875 B2
(45) Date of Patent: Sep. 27, 2016

(54) METHOD AND APPARATUS FOR CHANGING APPOINTED FORWARDING DEVICE

(71) Applicant: Huawei Technologies Co., Ltd., Shenzhen (CN)

(72) Inventors: Yizhou Li, Nanjing (CN); Donald Eggleston Eastlake, III, Milford, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/330,695

(22) Filed: Jul. 14, 2014

(65) Prior Publication Data

US 2014/0321326 A1    Oct. 30, 2014

Related U.S. Application Data (63) Continuation of application No. PCT/CN2012/083911, filed on Nov. 1, 2012.

(30) Foreign Application Priority Data

Apr. 13, 2012  (CN) .......................... 2012 1 0107801

(51) Int. Cl.
| | | |
|---|---|---|
| *H04L 12/24* | (2006.01) | |
| *H04L 12/46* | (2006.01) | |
| *H04L 12/751* | (2013.01) | |
| *H04L 12/715* | (2013.01) | |
| *H04L 12/721* | (2013.01) | |

(52) U.S. Cl.
CPC ........... *H04L 41/12* (2013.01); *H04L 12/4641* (2013.01); *H04L 45/02* (2013.01); *H04L 45/64* (2013.01); *H04L 45/66* (2013.01)

(58) Field of Classification Search
CPC ....... H04L 41/12; H04L 45/64; H04L 45/66; H04L 45/02; H04L 12/4641
See application file for complete search history.

(56) References Cited

FOREIGN PATENT DOCUMENTS

| CN | 102387078 A | 3/2012 |
|---|---|---|
| CN | 102394819 A | 3/2012 |

OTHER PUBLICATIONS

Request for Comments: 6327 "Routing Bridges (RBridges): Adjacency", Perlman, et al., Jul. 2011.*
Request for Comments: 6439 "Routing Bridges (RBridges): Appointed Forwarders", Perlman, et al., Nov. 2011.*

(Continued)

*Primary Examiner* — Jackie Zuniga Abad
(74) *Attorney, Agent, or Firm* — Conley Rose, P.C.; Grant Rodolph (57) ABSTRACT

A method and an apparatus for changing an appointed forwarding device. A first routing bridge receives an appointment packet for appointing the first routing bridge as an appointed forwarding device of a virtual local area network (VLAN); and immediately enters a forwarding state and starts to forward a packet of the VLAN, if the first routing bridge is in a state of being inhibited from forwarding packets of the VLAN when the first routing bridge receives a first advertisement packet carrying an identifier of the VLAN sent by a second routing bridge; the first advertisement packet is a broadcast packet and used to notify a neighboring routing bridge that the second routing bridge sending the first advertisement packet is not the appointed forwarding device of the VLAN; and the second routing bridge is an original appointed forwarding device of the VLAN application.

20 Claims, 4 Drawing Sheets

(56) References Cited

OTHER PUBLICATIONS

Request for Comments: 6325 "Routing Bridges (RBridges): Base Protocol Specification", Perlman, et al., Jul. 2011.*
Perlman, R., et al., "Routing Bridges (RBridges): Appointed Forwarders," RFC 6439, Nov. 2011, 15 pages.
Foreign Communication From a Counterpart Application, PCT Application No. PCT/CN2012/083911, English Translation of International Search Report dated Feb. 7, 2013, 2 pages.
Foreign Communication From a Counterpart Application, PCT Application No. PCT/CN2012/083911, Written Opinion dated Feb. 7, 2013, 4 pages.

* cited by examiner

METHOD AND APPARATUS FOR CHANGING APPOINTED FORWARDING DEVICE

CROSS REFERENCE TO RELATED APPLICATIONS

This application is a continuation of International Application No. PCT/CN2012/083911, filed on Nov. 1, 2012, which claims priority to Chinese Patent Application No. 201210107801.9, filed on Apr. 13, 2012, both of which are incorporated herein by reference in their entireties.

TECHNICAL FIELD

Embodiments of the present application relate to communications technologies, and in particular, to a method and an apparatus for changing an appointed forwarding device.

BACKGROUND

The Transparent Interconnect of Lots of Links Protocol (Trill) uses an appointed forwarder (AF) mechanism, which is used to appoint a routing bridge (RB) for forwarding packets of a specific virtual local area network (VLAN), so as to prevent local links from forming a loop, because the loop has a very great impact on a network and may cause the network to crash. In the AF mechanism, there is also a VLAN inhibition timer mechanism, which is used to strictly prevent a loop from being formed in a special case or in a case of network status transition.

The following describes the AF mechanism and the VLAN inhibition timer mechanism using RB1, RB2, and RB3 on a same link as an example. RB1, RB2, and RB3 are connected through a common switch (bridge). That is, RB1, RB2, and RB3 are connected on the same link, and it is assumed that VLAN 10 is enabled on their ports on this link. RB1 serves as a designated routing bridge (DRB), which is responsible for appointing an AF on the link. RB1 may appoint RB2 as an AF of VLAN 10, and RB1 itself responsible for AF work of another VLAN. In this case, RB2 is responsible for forwarding packets of VLAN 10, and periodically sends a Hello packet to a neighboring RB, indicating that RB2 is the AF of VLAN 10. After receiving the Hello packet, the neighbor of RB2 resets its own inhibition timer for VLAN 10, where the resetting refers to setting the inhibition timer to a default value again. The value of the inhibition timer keeps decrementing with time until it reaches zero. An RB that changes from a non-AF to the AF can start to forward a packet of VLAN 10 only when the inhibition timer for VLAN 10 decrements to 0; otherwise, the RB keeps a state of being inhibited from forwarding packets of VLAN 10. Periodically receiving a Hello packet from an AF of a VLAN prevents from decrementing of an inhibition timer for that VLAN to 0. Even if an RB is appointed as the AF of a VLAN, the RB cannot forward traffic of the VLAN if the inhibition timer for the VLAN does not expire. Therefore, if RB1 and RB3 receive a packet of VLAN 10, because neither RB1 nor RB3 is the AF of VLAN 10, they discard the packet, so as to prevent generation of a loop on the link. After running for a period of time, RB1 sends a Hello packet to appoint RB3 as the AF of VLAN 10, and no longer appoints RB2 as the AF of VLAN 10. After RB3 receives the Hello packet for appointing RB3 as the AF of VLAN 10, if an inhibition timer of RB3 for VLAN 10 does not expire, that is, the inhibition timer for VLAN 10 does not decrement to zero, RB3 still cannot forward a packet of VLAN 10. After receiving the Hello packet that is sent by the DRB and contains AF appointment information, RB2 discovers that RB2 itself is not the AF of VLAN 10. Therefore, RB2 immediately stops forwarding a packet of VLAN 10, and sets, in a Hello packet of VLAN 10 to be sent subsequently, an AF state bit of RB2 for VLAN 10 to zero. In this way, in Hello packets received by RB3 from the neighbors RB1 and RB2, the AF state bits for VLAN 10 are both zero. Because an inhibition timer of a VLAN is reset only when a Hello packet containing an AF state bit being 1 for the VLAN is received, the inhibition timer on RB3 is not reset any longer in this case but keeps decrementing until it reaches zero. When the inhibition timer for VLAN 10 on RB3 decrements to zero, RB3 already appointed as the AF of VLAN 10 starts to forward a packet of VLAN 10. Generally, an inhibition timer is set to be three times as long as a Hello interval, and may be up to 30 seconds.

However, according to the foregoing method, after RB3 receives the Hello packet for being appointed as the AF of VLAN 10, even if RB2 has given up a state of being the AF of VLAN 10 and no longer forwards a packet of VLAN 10, RB3 has to wait for the inhibition timer of VLAN 10 to expire (that is, to decrement to zero) before RB3 can forward a packet of VLAN 10. Therefore, an interruption time of the packet forwarding is relatively long.

SUMMARY

Embodiments of the present application provide a method and an apparatus for changing an appointed forwarding device, so as to solve a defect in the prior art that an interruption time of packet forwarding is relatively long in a process of changing an appointed forwarding device.

According to a first aspect, the present application provides a method for changing an appointed forwarding device, including: receiving, by a first routing bridge, an appointment packet for appointing the first routing bridge as an appointed forwarding device of a virtual local area network, where the appointment packet is broadcast by a designated routing bridge; and immediately entering, by the first routing bridge, a forwarding state and starting to forward a packet of the virtual local area network, if the first routing bridge is in a state of being inhibited from forwarding packets of the virtual local area network when the first routing bridge receives a first advertisement packet carrying an identifier of the virtual local area network sent by a second routing bridge; the first advertisement packet is a broadcast packet and used to notify a neighboring routing bridge that the second routing bridge sending the first advertisement packet is not the appointed forwarding device of the virtual local area network; and the second routing bridge is an original appointed forwarding device of the virtual local area network.

According to a second aspect, the present application provides an apparatus for changing an appointed forwarding device, including: a receiver configured to receive an appointment packet for appointing the apparatus as an appointed forwarding device of a virtual local area network, where the appointment packet is broadcast by a designated routing bridge; and receive a first advertisement packet is a broadcast packet and sent by a second routing bridge; the first advertisement packet is a broadcast packet and used to notify a neighboring routing bridge that the second routing bridge sending the first advertisement packet is not the appointed forwarding device of the virtual local area network; and the second routing bridge is an original appointed forwarding device of the virtual local area network; a controlling module configured to immediately send, if the apparatus is in a state of being inhibited from forwarding packets of the virtual local area network when the receiver receives the first advertisement packet, a forwarding indication to a forwarding module, so that the forwarding module starts to forward a packet of the virtual local area network; and the forwarding module configured to forward the packet of the virtual local area network after the forwarding indication is received from the controlling module.

According to the method and the apparatus for changing an appointed forwarding device provided by the embodiments of the present application, when a first RB appointed as an AF of a VLAN receives a first advertisement packet that is sent by an original AF of the VLAN and used to notify a neighboring RB that the original AF itself is not the AF of the VLAN, if the first RB is in a state of being inhibited from forwarding packets of the VLAN, the first RB can immediately enter a state of forwarding the packets of the VLAN, instead of needing to passively wait for expiry of an inhibition timer in the prior art so that the first RB starts to forward a packet of the VLAN only when the first RB changes to a forwarding state on the VLAN. In this way, an interruption time of packet forwarding is shortened in a process of changing the AF of the VLAN. After the first RB receives a second advertisement packet sent by a second RB, it may be determined that the second RB has given up forwarding the packets of the VLAN. Therefore, in a case where the first RB is still in the state of being inhibited from forwarding the packets of the VLAN, the first RB starts to forward a packet of the VLAN, and no loop is generated on the VLAN. According to the embodiments of the present application, in a case of ensuring that no loop is generated in the process of changing the AF, the interruption time of the packet forwarding is shortened.

DESCRIPTION OF EMBODIMENTS

Figure 1:
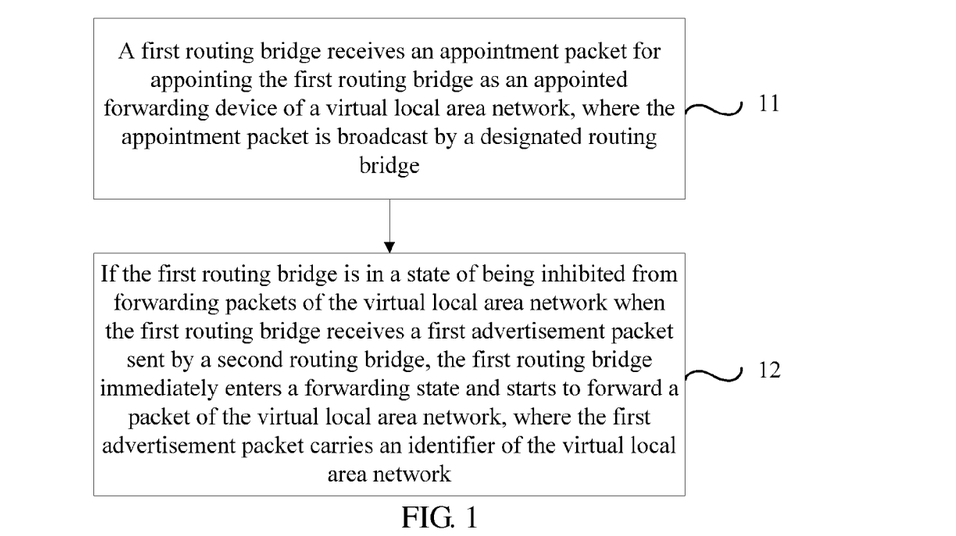
FIG. 1 is a flowchart of a method for changing an appointed forwarding device according to an embodiment of the present application.

FIG. 1 is a flowchart of a method for changing an appointed forwarding device according to an embodiment of the present application. An executor of this embodiment is an RB that changes from a non-AF to an AF. As shown in FIG. 1, this embodiment includes:

Step 11: A first routing bridge receives an appointment packet for appointing the first routing bridge as an appointed forwarding device of a virtual local area network, where the appointment packet is broadcast by a designated routing bridge.

In this embodiment, a VLAN x is used to represent a specific VLAN. When appointing the AF for the VLAN x, the DRB broadcasts an appointment packet that carries AF appointment information to neighboring RBs. The AF appointment information is information about appointing an RB as the AF of the VLAN x. The appointment packet may be a Hello packet that carries the AF appointment information. After receiving the appointment packet, an RB determines, according to the AF appointment information, whether the RB itself is appointed as the AF. The AF of the VLAN x is responsible for forwarding packets of the VLAN x, and a non-AF of the VLAN x directly discards a packet of the VLAN x after receiving the packet of the VLAN x.

When appointing the first RB as the AF of the VLAN x, the DRB broadcasts an appointment packet for appointing the first RB as the AF of the VLAN x to neighboring RBs. After receiving the appointment packet, the first RB determines, according to the AF appointment information, that the first RB itself is appointed as the AF of the VLAN x.

Step 12: If the first routing bridge is in a state of being inhibited from forwarding packets of the virtual local area network when the first routing bridge receives a first advertisement packet sent by a second routing bridge, the first routing bridge immediately enters a forwarding state and starts to forward a packet of the virtual local area network, where the first advertisement packet carries an identifier of the virtual local area network.

The first advertisement packet is used to notify a neighboring routing bridge that a routing bridge sending the first advertisement packet is not the appointed forwarding device of the virtual local area network; and the second routing bridge is an original appointed forwarding device of the virtual local area network.

A non-AF broadcasts the first advertisement packet to a neighboring RB. The first advertisement packet is used by the AF to notify a neighboring RB that an RB sending the first advertisement packet is not an AF of a VLAN. An RB that is not the AF of the VLAN x periodically notifies, through the first advertisement packet, a neighboring RB that the RB itself is not the AF of the VLAN x. The first advertisement packet may specifically be a Hello packet carrying the identifier of the VLAN and an AF state bit being 0. An RB periodically receives the first advertisement packet sent by the RB that is not the AF of the VLAN x. An RB may learn, through the first advertisement packet, that a neighboring RB sending the first advertisement packet is not the AF of the VLAN x.

The second RB is the original AF of the VLAN x. If the second RB determines, after receiving the appointment packet sent by the DRB for appointing the first RB as the AF of the VLAN x, that the second RB itself is no longer the AF of the VLAN x, the second RB immediately gives up forwarding a packet of the VLAN x and periodically broadcasts the first advertisement packet to a neighboring RB, so as to broadcast the neighboring RB that the second RB itself is not the AF of the VLAN x.

When the first RB receives the first advertisement packet sent by the second RB (that is, the original AF of the VLAN x), the first RB may be still in the state of being inhibited from forwarding the packets of the VLAN x, where the first advertisement packet carries an identifier of the VLAN x. For example, when receiving a second advertisement packet sent by the second RB (that is, the original AF of the VLAN x), the first RB resets an inhibition timer of the VLAN x. The AF broadcasts the second advertisement packet to a neighbor, where the second advertisement packet is used to notify the neighboring RB that an RB sending the second advertisement packet is the AF of the VLAN x. When the first RB receives the appointment packet sent by the DRB for appointing the first RB itself as the AF of the VLAN x, in order to avoid generation of a loop on the VLAN x, the first RB cannot forward a packet of the VLAN x in a case where the inhibition timer of the VLAN x does not expire. That is, the first RB keeps the state of being inhibited from forwarding the packets of the VLAN x.

If the first RB appointed as the AF of the VLAN x determines that the first RB is still in the state of being inhibited from forwarding the packets of the VLAN x when the first advertisement packet carrying the identifier of the VLAN x and sent by the second RB (that is, the original AF of the VLAN x) is received, the first RB starts to forward a packet of the VLAN x, instead of passively waiting for expiry of an inhibition timer in the prior art so that the first RB starts to forward a packet of the VLAN x only when the first RB changes to a forwarding state on the VLAN x. After the first RB receives the first advertisement broadcast packet sent by the second RB, it may be determined that the second RB has given up forwarding packets of the VLAN x. Therefore, the first RB immediately starts to forward a packet of the VLAN x, and no loop is generated on the VLAN x. For example, after the current AF (that is, the first RB) of the VLAN x receives the first advertisement packet sent by the original AF (that is, the second RB) of the VLAN x, if the inhibition timer of the VLAN x does not expire, the first RB immediately causes the inhibition timer of the VLAN x to expire and starts to forward a packet of the VLAN x, instead of waiting for expiry of the inhibition timer of the VLAN x before starting to forward the packet of the VLAN x.

Further, to shorten an interruption time of packet forwarding, if the second RB determines, after receiving the appointment packet broadcast by the DRB, that the second RB itself is no longer the AF of the VLAN x, the second RB immediately broadcasts the first advertisement packet to a neighboring RB, so as to shorten a time interval from a moment when the first RB newly appointed as the AF receives the appointment packet to a moment when the first RB receives the first advertisement packet sent by the second RB, so that the first RB starts to forward a packet within a shortest time.

Further, because an RB that is a non-AF may also periodically broadcast the first advertisement packet on the VLAN x, the current AF (that is, the first RB) of the VLAN x also receives the first advertisement packet broadcast by an RB except the second RB on the VLAN x. It may be determined, using the following method, whether the first advertisement packet sent by the original AF (that is, the second RB) of the VLAN x is received. After receiving the second advertisement packet from the AF, each RB records an identifier of an RB that sends the second advertisement packet; and after receiving the first advertisement packet, the current AF (that is, the first RB) of the VLAN x can determine, according to an identifier of an RB that sends the first advertisement packet and the recorded identifier of the RB that sends the second advertisement packet, whether the first advertisement packet currently received is the first advertisement packet sent by the original AF (that is, the second RB) of the VLAN x.

In the method for changing an appointed forwarding device provided in this embodiment, when a first RB appointed as an AF of a VLAN receives a first advertisement packet that is sent by an original AF of the VLAN and used to notify a neighboring RB that the original AF is not the AF of the VLAN, if the first RB is in a state of being inhibited from forwarding packets of the VLAN, the first RB can immediately enter a state of forwarding the packets of the VLAN, instead of needing to passively wait for expiry of an inhibition timer in the prior art so that the first RB starts to forward a packet of the VLAN only when the first RB changes to a forwarding state on the VLAN. In this way, an interruption time of packet forwarding is shortened in a process of changing the AF of the VLAN. After the first RB receives a second advertisement broadcast packet sent by a second RB, it may be determined that the second RB has given up forwarding the packets of the VLAN. Therefore, in a case where the first RB is still in the state of being inhibited from forwarding the packets of the VLAN, the first RB starts to forward a packet of the VLAN, and no loop is generated on the VLAN. According to this embodiment of the present application, in a case of ensuring that no loop is generated in the process of changing the AF, the interruption time of the packet forwarding is shortened.

Figure 2:
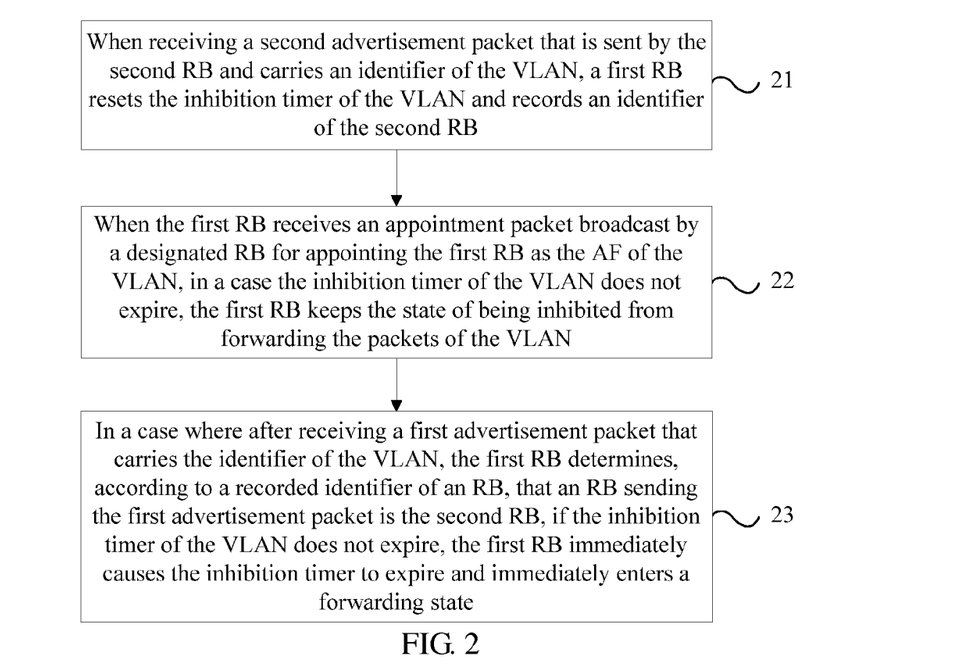
FIG. 2 is a flowchart of another method for changing an appointed forwarding device according to an embodiment of the present application.

FIG. 2 is a flowchart of another method for changing an appointed forwarding device according to an embodiment of the present application. In this embodiment, for avoiding a loop, an inhibition timer of a VLAN is arranged, so that when an RB that is a non-AF is appointed as an AF, the RB keeps a state of being inhibited from forwarding packets of the VLAN. The method provided in this embodiment includes:

Step 21: When receiving a second advertisement packet that is sent by a second RB and carries an identifier of the VLAN, a first RB resets the inhibition timer of the VLAN and records an identifier of the second RB, where the second advertisement packet is used to notify a neighboring RB that an RB sending the second advertisement packet is the AF of the VLAN.

Step 22: When the first RB receives an appointment packet broadcast by a designated RB for appointing the first RB as the AF of the VLAN, in a case where the inhibition timer of the VLAN does not expire, the first RB keeps the state of being inhibited from forwarding the packets of the VLAN.

When the first RB receives the appointment packet broadcast by the designated RB for appointing the first RB as the AF of the VLAN, if the inhibition timer of the VLAN already expires, the first RB immediately starts to forward a packet of the VLAN.

Step 23: In a case where after receiving a first advertisement packet that carries the identifier of the VLAN, the first RB determines, according to a recorded identifier of an RB, that an RB sending the first advertisement packet is the second RB, if the inhibition timer of the VLAN does not expire, the first RB immediately causes the inhibition timer to expire and immediately enters a forwarding state.

Because an RB that is a non-AF may also periodically broadcast the first advertisement packet on the VLAN, the first RB also receives the first advertisement packet broadcast by an RB except the second RB on the VLAN. To determine whether the first advertisement packet sent by an original AF (that is, the second RB) of the VLAN is received, each RB may record an identifier of the AF when the second advertisement packet sent by the AF is received. After being appointed as the AF, an RB may determine, according to the recorded identifier of the original AF, whether an RB currently sending the first advertisement packet is the original AF.

In the method for changing an appointed forwarding device provided by this embodiment, after a first RB is appointed as an AF, when a first advertisement packet sent by an original AF (that is, a second RB) is not yet received, the first RB determines, according to whether an inhibition timer expires, whether to forward a packet; and when receiving the first advertisement packet sent by the second RB, that is, determining that the second RB has given up the forwarding, the first RB immediately starts to forward a packet, instead of needing to wait for expiry of the inhibition timer before starting to forward a packet. In this way, an interruption time of packet forwarding is shortened.

Figure 3A:
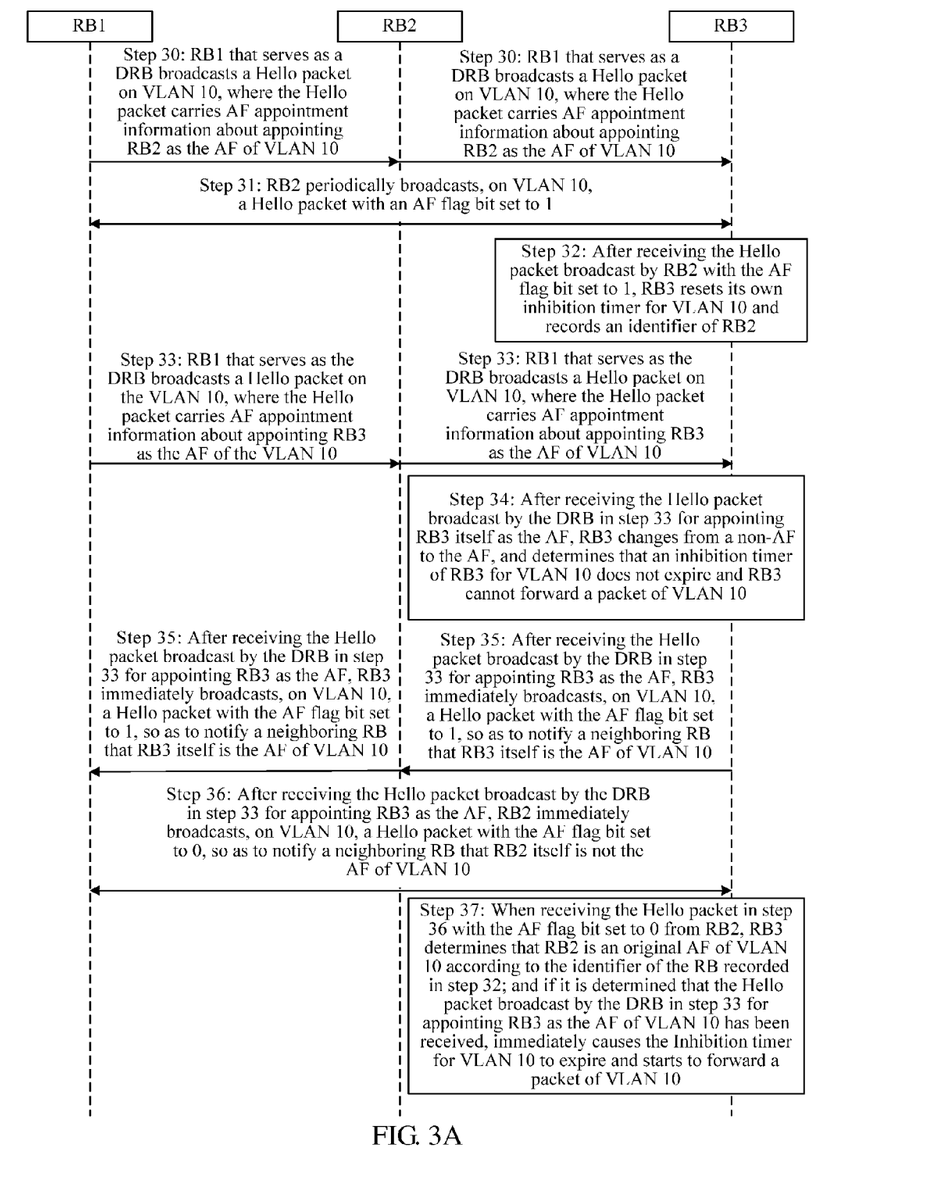
FIG. 3A is a flowchart of still another method for changing an appointed forwarding device according to an embodiment of the present application.
Figure 3B:
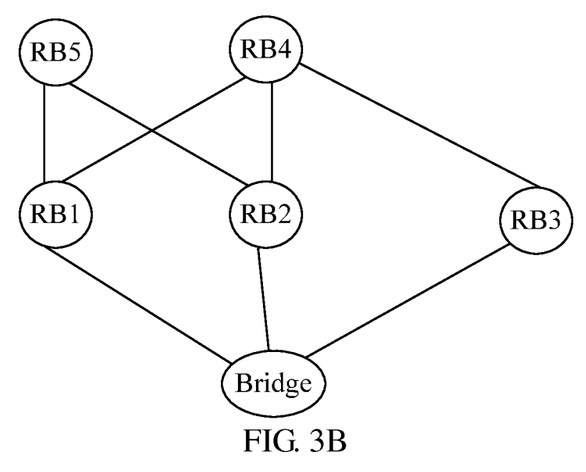
FIG. 3B is a diagram of an application scenario of FIG. 3A.

FIG. 3A is a flowchart of still another method for changing an appointed forwarding device according to an embodiment of the present application. FIG. 3B is a diagram of an application scenario of FIG. 3A. In this embodiment, a specific process of changing RB3 that is a non-AF of VLAN 10 to the AF of VLAN 10 is described. As shown in FIG. 3A, this embodiment includes:

Step 30: RB1 that serves as a DRB broadcasts a Hello packet on VLAN 10, where the Hello packet carries AF appointment information about appointing RB2 as the AF of VLAN 10.

Step 31: RB2 periodically broadcasts, on VLAN 10, a Hello packet with an AF flag bit set to 1, so as to notify a neighboring RB that RB2 itself is the AF of VLAN 10.

As shown in FIG. 3B, RB1, RB2, and RB3 are connected through a common switch (bridge). That is, RB1, RB2, and RB3 are connected on a same link. After RB1 becomes a DRB on the link, RB1 is responsible for appointing an AF on the link. RB1 appoints RB2 as the AF of VLAN 10, and RB1 is responsible for AF work of another VLAN. In this case, ports of RB1 and RB3 on this link cannot forward a packet of VLAN 10, and if a packet of VLAN 10 is received, the packet is discarded. For example, RB2 receives a broadcast packet of VLAN 10 from a network side, and forwards the broadcast packet to a downlink port. After receiving the packet, the bridge continues to forward the packet on all other ports on which VLAN 10 is enabled, except for an input port. After the packet reaches RB1 and RB3, because RB1 and RB3 are not the AF of VLAN 10, the packet is directly discarded.

An RB not appointed as the AF on the VLAN may also periodically broadcast, on VLAN 10, a Hello packet with the AF flag bit set to 0, so as to notify a neighboring RB that the RB itself is not the AF of VLAN 10.

Step 32: After receiving the Hello packet broadcast by RB2 with the AF flag bit set to 1, RB3 resets its own inhibition timer for VLAN 10 and records an identifier of RB2. That is, an RB that broadcasts the Hello packet with the AF flag bit set to 1 is recorded.

After an RB receives a Hello packet that carries VLAN information and has the AF flag bit set to 1, because the AF flag bit in the Hello packet is set to 1, the RB may determine that an RB sending the Hello packet is the AF of the VLAN. The RB receiving the Hello packet that carries the VLAN information and has the AF flag bit set to 1 resets the inhibition timer of VLAN 10 to a default value, and records an identifier of the RB broadcasting the Hello packet with the AF flag bit set to 1, that is, records an identifier of an RB that is the AF of VLAN 10. Resetting the inhibition timer is setting the inhibition timer to the default value again. Expiry of the inhibition timer means that the inhibition timer is decremented to 0.

Step 33: RB1 that serves as the DRB broadcasts a Hello packet on VLAN 10, where the Hello packet carries AF appointment information about appointing RB3 as the AF of VLAN 10.

Step 34: After receiving the Hello packet broadcast by the DRB in step 33 for appointing RB3 itself as the AF, RB3 changes from a non-AF to the AF, and determines that an inhibition timer of RB3 for VLAN 10 does not expire and RB3 cannot forward a packet of VLAN 10.

RB3 learns, through the Hello packet broadcast by the DRB in step 30, that RB3 itself is not appointed as the AF of VLAN 10; then learns, through the Hello packet broadcast by the DRB in step 33, that RB3 itself is appointed as the AF; and therefore, determines that RB3 itself has changed from a non-AF to the AF. After determining that RB3 itself is the AF, RB3 checks whether its inhibition timer for VLAN 10 expires. If the inhibition timer for VLAN 10 does not expire, RB3 cannot forward a packet of VLAN 10.

Step 35: After receiving the Hello packet broadcast by the DRB in step 33 for appointing RB3 as the AF, RB3 immediately broadcasts, on VLAN 10, a Hello packet with the AF flag bit set to 1, so as to notify a neighboring RB that RB3 itself is the AF of VLAN 10.

Step 36: After receiving the Hello packet broadcast by the DRB in step 33 for appointing RB3 as the AF, RB2 immediately broadcasts, on VLAN 10, a Hello packet with the AF flag bit set to 0, so as to notify a neighboring RB that RB2 itself is not the AF of VLAN 10.

A sequence of step 35 and step 36 is not fixed, and is related to a sequence for RB2 and RB3 to receive the Hello packets from the DRB.

Step 37: When receiving the Hello packet in step 36 with the AF flag bit set to 0 from RB2, RB3 determines that RB2 is an original AF of VLAN 10 according to the identifier of the RB recorded in step 32; and if it is determined that the Hello packet broadcast by the DRB in step 33 for appointing RB3 as the AF of VLAN 10 has been received, immediately causes the inhibition timer for VLAN 10 to expire and starts to forward a packet of VLAN 10.

RB3 may be later than RB2 in receiving the Hello packet broadcast by the DRB for appointing RB3 as the AF of VLAN 10, or even may not yet receive the Hello packet broadcast by the DRB in step 33 for appointing RB3 as the AF of VLAN 10 when RB3 has received the Hello packet broadcast by RB2 in step 36 with the AF flag bit set to 0. Therefore, there are two conditions for RB3 to immediately forward a packet of VLAN 10: One is that it is determined that the Hello packet broadcast by the DRB for appointing RB3 as the AF of VLAN 10 is received, and no packet of VLAN 10 is forwarded after this appointment, where the reason why no packet of VLAN 10 is forwarded is that the inhibition timer of VLAN 10 does not expire; and the other is that the Hello packet with the AF flag bit set to 0 sent by the original AF (that is, RB2) on VLAN 10 is received. A sequence for RB3 to receive the Hello packet broadcast by the DRB in step 33 for appointing RB3 as the AF and for RB3 to receive the Hello packet broadcast by RB2 in step 36 with the AF bit set to 0 is not fixed.

Figure 4:
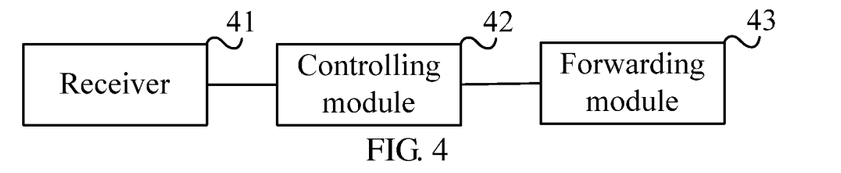
FIG. 4 is a schematic structural diagram of an apparatus for changing an appointed forwarding device according to an embodiment of the present application.

FIG. 4 is a schematic structural diagram of an apparatus for changing an appointed forwarding device according to an embodiment of the present application. In this embodiment, the apparatus for changing an appointed forwarding device may be a routing bridge. As shown in FIG. 4, the apparatus provided in this embodiment includes a receiver 41, a controlling module 42, and a forwarding module 43.

The receiver 41 is configured to receive an appointment packet for appointing the apparatus as an appointed forwarding device of a virtual local area network, where the appointment packet is broadcast by a designated routing bridge; and receive a first advertisement packet sent by a second routing bridge, where the first advertisement packet carries an identifier of the virtual local area network; the first advertisement packet is used to notify a neighboring routing bridge that a routing bridge sending the first advertisement packet is not the appointed forwarding device of the virtual local area network; and the second routing bridge is an original appointed forwarding device of the virtual local area network. The appointment packet is a Hello packet for appointing a routing bridge as the appointed forwarding device of the virtual local area network. The first advertisement packet is a Hello packet with an appointed forwarding device bit being 0.

The controlling module 42 is configured to immediately send, if the apparatus is in a state of being inhibited from forwarding packets of the virtual local area network when the receiver receives the first advertisement packet, a forwarding indication to the forwarding module 43, so that the forwarding module starts to forward a packet of the virtual local area network.

The forwarding module 43 is configured to forward the packet of the virtual local area network after the forwarding indication is received from the controlling module.

According to the apparatus provided in this embodiment, when a receiver receives a first advertisement packet that is sent by an original AF of a VLAN and used to notify a neighboring RB that the original AF itself is not an AF of the VLAN, if the apparatus is in a state of being inhibited from forwarding packets of the VLAN, a controlling module 42 causes a forwarding module 43 to immediately enter a state of forwarding the packets of the VLAN, instead of passively waiting for expiry of an inhibition timer in the prior art before starting to forward a packet of the VLAN. In this way, an interruption time of packet forwarding is shortened in a process of changing the AF of the VLAN.

Figure 5:
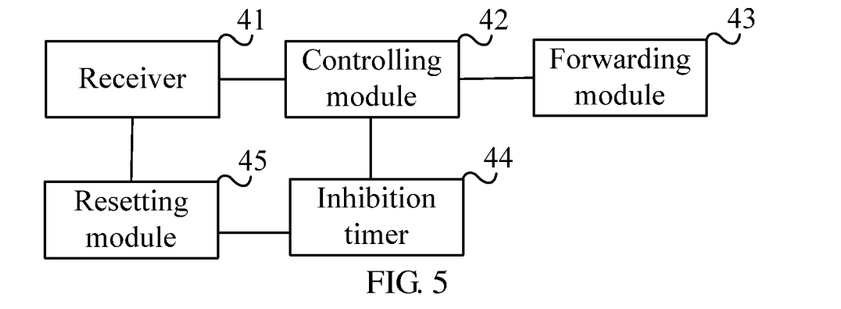
FIG. 5 is a schematic structural diagram of another apparatus for changing an appointed forwarding device according to an embodiment of the present application.

FIG. 5 is a schematic structural diagram of another apparatus for changing an appointed forwarding device according to an embodiment. As shown in FIG. 5, on the basis of FIG. 4, this embodiment further includes: an inhibition timer 44 and a resetting module 45.

The inhibition timer 44 is configured to trigger, in a case of expiry, the controlling module to send the forwarding indication to the forwarding module.

The resetting module 45 is configured to reset the inhibition timer of the virtual local area network when the receiver 41 receives a second advertisement packet sent by the second routing bridge, where the second advertisement packet carries the identifier of the virtual local area network; and the second advertisement packet is used to notify a neighboring routing bridge that a routing bridge sending the second advertisement packet is the appointed forwarding device of the virtual local area network.

The controlling module 42 is further configured to cause, if the inhibition timer of the virtual local area network does not expire and the first advertisement packet sent by the second routing bridge is not received, the forwarding module to keep the state of being inhibited from forwarding the packets of the virtual local area network, where the first advertisement packet carries the identifier of the virtual local area network.

The controlling module is specifically configured to immediately cause the inhibition timer to expire and send the forwarding indication to the forwarding module, if the inhibition timer of the virtual local area network does not expire when the receiver receives the first advertisement packet sent by the second routing bridge and carrying the identifier of the virtual local area network; or cause, if the inhibition timer of the virtual local area network does not expire and the first advertisement packet sent by the second routing bridge and carrying the identifier of the virtual local area network is not received, the forwarding module to keep the state of being inhibited from forwarding the packets of the virtual local area network.

After the apparatus provided in this embodiment is appointed as an AF, when a first advertisement packet sent by an original AF (that is, a second RB) is not received, a controlling module determines, according to whether an inhibition timer expires, whether to forward a packet; and when receiving the first advertisement packet sent by the second RB, the controlling module determines that the second RB has given up the forwarding and immediately causes a forwarding module to start to forward a packet, instead of needing to wait for expiry of the inhibition timer before starting to forward a packet. In this way, an interruption time of packet forwarding is shortened.

Figure 6:
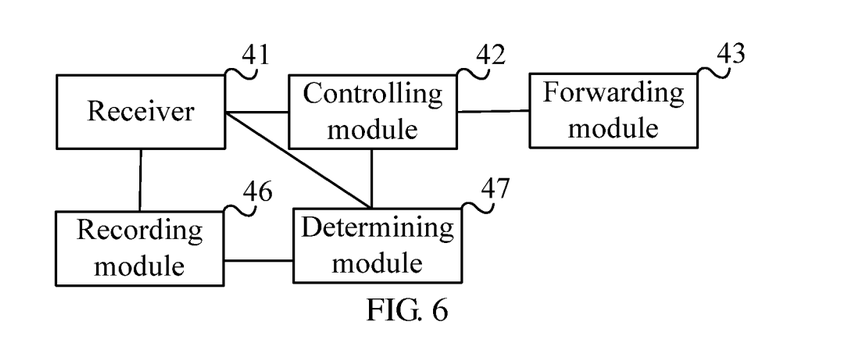
FIG. 6 is a schematic structural diagram of still another apparatus for changing an appointed forwarding device according to an embodiment of the present application.

FIG. 6 is a schematic structural diagram of still another apparatus for changing an appointed forwarding device according to an embodiment. As shown in FIG. 6, on the basis of FIG. 4, this embodiment further includes a recording module 46 and a determining module 47.

The recording module 46 is configured to record an identifier of the second routing bridge when the receiver 41 receives the second advertisement packet sent by the second routing bridge, where the second advertisement packet carries the identifier of the virtual local area network.

The determining module 47 is configured to: after the receiver 41 receives the first advertisement packet that carries the identifier of the virtual local area network, determine, according to the identifier of the routing bridge recorded by the recording module and an identifier of the routing bridge that sends the first advertisement packet, that the routing bridge sending the first advertisement packet is the second routing bridge.

When the determining module 47 determines that the routing bridge sending the first advertisement packet is the second routing bridge, if the inhibition timer of the virtual local area network does not expire, the controlling module 42 immediately causes the inhibition timer to expire and sends the forwarding indication to the forwarding module; or if the inhibition timer of the virtual local area network does not expire and the determining module 47 determines that the first advertisement packet sent by the second routing bridge is not received, the controlling module 42 causes the forwarding module to keep the state of being inhibited from forwarding the packets of the virtual local area network, where the first advertisement packet carries the identifier of the virtual local area network.

For functions of the modules in the foregoing apparatus embodiments, refer to the description in the method embodiments, and no further details are provided herein.

Persons of ordinary skill in the art may understand that, all or a part of the steps of the method embodiments may be implemented by a program instructing relevant hardware. The foregoing program may be stored in a computer readable storage medium. When the program runs, the steps of the foregoing method embodiments are performed. The foregoing storage medium may include any mediums capable of storing program code, such as a read only memory (ROM), a random access memory (RAM), a magnetic disk, or an optical disc.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments or make equivalent replacements to some or all technical features of the technical solutions, as long as such modifications or replacements do not cause the corresponding technical solutions to depart from the scope of the technical solutions of the embodiments of the present application.

What is claimed is:

1. A method for changing an appointed forwarding device, comprising:
    receiving, by a first routing bridge, an appointment packet for appointing the first routing bridge as an appointed forwarding device of a virtual local area network, wherein the appointment packet is broadcast by a designated routing bridge;
    entering, by the first routing bridge, a forwarding state after receiving the appointment packet; and
    forwarding, by the first routing bridge, a packet of the virtual local area network after determining that the first routing bridge is in a state of being inhibited from forwarding packets of the virtual local area network and after receiving a first advertisement packet carrying an identifier of the virtual local area network sent by a second routing bridge,
    wherein the first advertisement packet is a broadcast packet and is used to notify a neighboring routing bridge that the second routing bridge sending the first advertisement packet is not the appointed forwarding device of the virtual local area network,
    wherein the second routing bridge is an original appointed forwarding device of the virtual local area network, and
    wherein the state of being inhibited from forwarding the packets of the virtual local area network occurs when an inhibition timer associated with the first routing bridge is not expired.

2. The method according to claim 1, further comprising:
    resetting, by the first routing bridge, the inhibition timer of the virtual local area network when a second advertisement packet carrying the identifier of the virtual local area network sent by the second routing bridge is received, wherein the second advertisement packet is a broadcast packet and is used to notify the neighboring routing bridge that the second routing bridge sending the second advertisement packet is the appointed forwarding device of the virtual local area network; and
    keeping, by the first routing bridge, the state of being inhibited from forwarding the packets of the virtual local area network when the inhibition timer of the virtual local area network does not expire and the first advertisement packet carrying the identifier of the virtual local area network sent by the second routing bridge is not received.

3. The method according to claim 2, wherein entering, by the first routing bridge, the forwarding state when the first routing bridge is in the state of being inhibited from forwarding packets of the virtual local area network comprises causing, by the first routing bridge, the inhibition timer to expire when the inhibition timer of the virtual local area network does not expire.

4. The method according to claim 2, further comprising:
    recording, by the first routing bridge, an identifier of the second routing bridge when the second advertisement packet carrying the identifier of the virtual local area network sent by the second routing bridge is received; and
    after the first advertisement packet carrying the identifier of the virtual local area network is received, determining, by the first routing bridge according to a recorded identifier of the second routing bridge and an identifier of a routing bridge that sends the first advertisement packet, that the second routing bridge sending the first advertisement packet is the original appointed forwarding device of the virtual local area network.

5. The method according to claim 1, further comprising sending, by the second routing bridge, the first advertisement packet to the neighboring routing bridge after the appointment packet sent by the designated routing bridge is received.

6. The method according to claim 2, wherein the first advertisement packet is a Hello packet with an appointed forwarding device bit being 0, wherein the second advertisement packet is a Hello packet with an appointed forwarding device bit being 1, and wherein the appointment packet is a Hello packet for appointing a routing bridge as the appointed forwarding device of the virtual local area network.

7. An apparatus for changing an appointed forwarding device, comprising:
    a transmitter;
    a processor coupled to the transmitter; and
    a receiver coupled to the processor and configured to:
        receive an appointment packet for appointing the apparatus as an appointed forwarding device of a virtual local area network, wherein the appointment packet is broadcast by a designated routing bridge; and
        receive a first advertisement packet carrying an identifier of the virtual local area network sent by a second routing bridge, wherein the first advertisement packet is a broadcast packet and used to notify a neighboring routing bridge that the second routing bridge sending the first advertisement packet is not the appointed forwarding device of the virtual local area network, and wherein the second routing bridge is an original appointed forwarding device of the virtual local area network,
    wherein the processor is configured to send, after determining that the apparatus is in a state of being inhibited from forwarding packets of the virtual local area network and after the receiver receives the first advertisement packet, a forwarding indication to the transmitter so that the transmitter starts to forward a packet of the virtual local area network,
    wherein the transmitter is configured to forward the packet of the virtual local area network after the forwarding indication is received, and
    wherein the state of being inhibited from forwarding the packets of the virtual local area network occurs when an inhibition timer associated with the first routing bridge is not expired.

8. The apparatus according to claim 7, wherein the processor is further configured to:
    trigger, in a case of expiry, the processor to send the forwarding indication to the transmitter; and
    reset the inhibition timer of the virtual local area network when the receiver receives a second advertisement packet carrying the identifier of the virtual local area network sent by the second routing bridge,
    wherein the second advertisement packet is a broadcast packet and used to notify the neighboring routing bridge that the second routing bridge sending the second advertisement packet is the appointed forwarding device of the virtual local area network, and wherein the processor is further configured to cause the transmitter to keep the state of being inhibited from forwarding the packets of the virtual local area network when the inhibition timer of the virtual local area network does not expire and the first advertisement packet carrying the identifier of the virtual local area network sent by the second routing bridge is not received.

9. The apparatus according to claim 8, wherein the processor is further configured to cause the inhibition timer to expire and send the forwarding indication to the transmitter when the inhibition timer of the virtual local area network does not expire and when the receiver receives the first advertisement packet carrying the identifier of the virtual local area network sent by the second routing bridge.

10. The apparatus according to claim 8, wherein the processor is further configured to keep the state of being inhibited from forwarding the packets of the virtual local area network when the inhibition timer of the virtual local area network does not expire and the first advertisement packet carrying the identifier of the virtual local area network sent by the second routing bridge is not received.

11. The apparatus according to claim 8, wherein the processor is further configured to:
record an identifier of the second routing bridge when the receiver receives the second advertisement packet carrying the identifier of the virtual local area network sent by the second routing bridge; and
determine, according to the identifier of the second routing bridge recorded and an identifier of a routing bridge that sends the first advertisement packet, that the second routing bridge sending the first advertisement packet is the original appointed forwarding device of the virtual local area network after the receiver receives the first advertisement packet carrying the identifier of the virtual local area network.

12. The apparatus according to claim 8, wherein the first advertisement packet is a Hello packet with an appointed forwarding device bit being 0, wherein the second advertisement packet is a Hello packet with an appointed forwarding device bit being 1, and wherein the appointment packet is a Hello packet for appointing a routing bridge as the appointed forwarding device of the virtual local area network.

13. A non-transitory computer readable medium having computer-executable instructions stored thereon, the computer executable instructions comprising instructions for:
receiving an appointment packet for appointing a first routing bridge as an appointed forwarding device of a virtual local area network, wherein the appointment packet is broadcast by a designated routing bridge;
entering a forwarding state after receiving the appointment packet; and
forwarding a packet of the virtual local area network after determining that the first routing bridge is in a state of being inhibited from forwarding packets of the virtual local area network and after receiving a first advertisement packet carrying an identifier of the virtual local area network sent by a second routing bridge, wherein the first advertisement packet is a broadcast packet and is used to notify a neighboring routing bridge that the second routing bridge sending the first advertisement packet is not the appointed forwarding device of the virtual local area network, wherein the second routing bridge is an original appointed forwarding device of the virtual local area network, and wherein the state of being inhibited from forwarding the packets of the virtual local area network occurs when an inhibition timer associated with the first routing bridge is not expired.

14. The non-transitory computer readable medium of claim 13, wherein the computer executable instructions further comprise instructions for:
resetting the inhibition timer of the virtual local area network when a second advertise packet carrying the identifier of the virtual local area network sent by the second routing bridge is received, wherein the second advertisement packet is a broadcast packet and is used to notify the neighboring routing bridge that the second routing bridge sending the second advertisement packet is the appointed forwarding device of the virtual local area network; and
keeping the state of being inhibited from forwarding the packets of the virtual local area network when the inhibition timer of the virtual local area network does not expire and the first advertisement packet carrying the identifier of the virtual local area network sent by the second routing bridge is not received.

15. The non-transitory computer readable medium of claim 13, wherein the computer executable instructions further comprise instructions for recording an identifier of the second routing bridge when a second advertisement packet carrying an identifier of the virtual local area network sent by the second routing bridge is received.

16. The non-transitory computer readable medium of claim 13, wherein the computer executable instructions further comprise instructions for in response to receiving the first advertisement packet carrying an identifier of the virtual local area network, determining, according to a recorded identifier of the second routing bridge and an identifier of a routing bridge that sends a first advertisement packet, that the second routing bridge sending the first advertisement packet is the original appointed forwarding device of the virtual local area network.

17. The non-transitory computer readable medium of claim 13, wherein the first advertisement packet comprises an appointed forwarding device bit indicating that the second routing bridge is not the appointed forwarding device.

18. The non-transitory computer readable medium of claim 13, wherein the first advertisement packet comprises an appointed forwarding device bit indicating that the first routing bridge is the appointed forwarding device.

19. The non-transitory computer readable medium of claim 13, wherein the appointment packet is a Hello packet for appointing a routing bridge as the appointed forwarding device of the virtual local area network.

20. The non-transitory computer readable medium of claim 13, wherein the computer executable instructions further comprise instructions for immediately entering a forwarding state upon receiving the appointment packet.

* * * * *

UNITED STATES PATENT AND TRADEMARK OFFICE
CERTIFICATE OF CORRECTION

PATENT NO. : 9,455,875 B2  
APPLICATION NO. : 14/330695  
DATED : September 27, 2016  
INVENTOR(S) : Yizhou Li et al.

Page 1 of 1

It is certified that error appears in the above-identified patent and that said Letters Patent is hereby corrected as shown below:

In the Claims

Column 14, Line 12, Claim 14 should read:

The non-transitory computer readable medium of claim 13, wherein the computer executable instructions further comprise instructions for:
   resetting the inhibition timer of the virtual local area network when a second advertisement packet carrying the identifier of the virtual local area network sent by the second routing bridge is received, wherein the second advertisement packet is a broadcast packet and is used to notify the neighboring routing bridge that the second routing bridge sending the second advertisement packet is the appointed forwarding device of the virtual local area network; and
   keeping the state of being inhibited from forwarding the packets of the virtual local area network when the inhibition timer of the virtual local area network does not expire and the first advertisement packet carrying the identifier of the virtual local area network sent by the second routing bridge is not received.

Signed and Sealed this  
Sixth Day of December, 2016

Michelle K. Lee  
*Director of the United States Patent and Trademark Office*